Patented June 21, 1949

2,473,853

UNITED STATES PATENT OFFICE 2,473,853

FREQUENCY CONTROL SYSTEM

John R. Boykin, Baltimore, Md., assignor to Westinghouse Electric Corporation, East Pittsburgh, Pa., a corporation of Pennsylvania Application January 22, 1946, Serial No. 643,006

8 Claims. (Cl. 250—36)

My invention relates to frequency regulating devices, and in particular relates to devices for maintaining the average frequency of an oscillator generator, governed in periodicity by an inductance-capacitance network, equal at all times to the frequency of a standard-frequency source such as an oscillator controlled by a piezo-electric vibrator. This arrangement is particularly well adapted to maintain the center frequency of an oscillation generator for frequency-modulated waves constantly equal to the frequency of a standard-frequency source. In the embodiment here used to illustrate the principles of my invention, it is applied through the agency of a reactance tube which regulates the reactance of the frequency determining circuit of the regulated oscillator.

This invention is a modification of, and in some respects an improvement upon, the frequency measuring and regulating device described in my copending application for measuring devices filed June 16, 1945, Serial No. 599,841, now abandoned, and assigned to the Westinghouse Electric Corporation.

One object of my invention is to provide an arrangement which shall produce a direct-current voltage which is responsive to variations in frequency between two alternating-current sources.

Another object of my invention is to provide an arrangement which employs a direct-current voltage to regulate the reactance of a reactance-tube.

Still another object of my invention is to provide an arrangement in which a direct-current voltage changes the control voltage on a reactance tube incorporated in the frequency-determining circuit of an oscillation generator whenever the frequency of said generator deviates from that of a second alternating-current source.

A still further object of my invention is to provide an arrangement in which the charge on a capacitor is altered whenever the frequency of one alternating-current source deviates from that of another alternating-current source.

Still another object of my invention is to provide a system in which the charge on a capacitor is increased when the frequency of one alternating-current source becomes greater than that of a second alternating-current source, and in which the said charge is decreased when the frequency of the first-mentioned alternating-current source becomes smaller than that of the second-mentioned alternating-current source.

Figure 1:
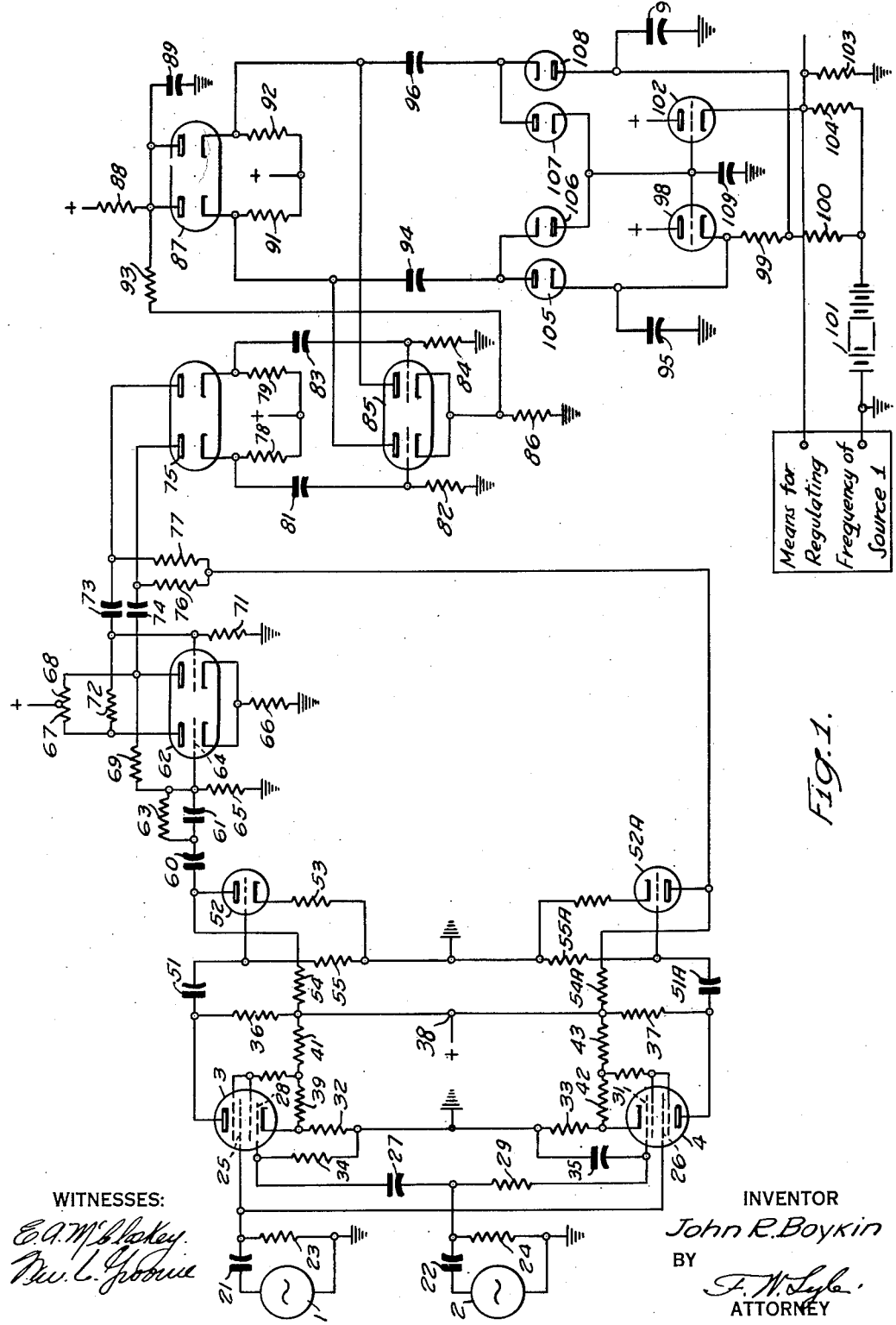

Other objects of my invention will become apparent upon reading the following description taken in connection with the drawings, in which:

Figure 1 is a schematic diagram illustrating one circuit embodying the principles of my invention, and Figs. 2 to 7 are graphs of wave forms useful in describing the mode of operation of the circuit of Fig. 1.

Referring in detail to Fig. 1, reference numeral 1 represents an alternating-current source, of which the frequency is to be regulated and reference numeral 2 represents a standard frequency source such, for example, as a generator controlled by a piezo-electric vibrator. The sources 1 and 2 impress their output voltages through suitable phase displacing networks adapted to cause them to make the voltage impressed by one of them on a pair of mixer tubes 3 and 4 which are similar to the similarly numbered tubes in my above-mentioned copending application, wherein similar elements are designated by the same reference numerals. Thus the respective alternating-current sources 1 and 2 are respectively connected through suitable coupling capacitors 21 and 22, to resistors 23 and 24, of which one terminal is grounded. The nongrounded terminal of resistor 23 is connected to one of the control grids 25 of a mixer tube 3 and also to the control grid 26 of a mixer tube 4. The ungrounded terminal of the resistor 24 is similarly connected through a capacitor 27 to the other control grid 28 of the mixer tube 3 and is directly connected through a resistor 29 to the other control grid 31 of the mixer tube 4. The cathode of the mixer tube 3 is preferably grounded through a resistor 32 and the cathode of the mixer tube 4 is similarly grounded through a resistor 33. A resistor 34 connects the control grid 28 to ground and a capacitor 35 connects the control grid 31 to ground. The anodes of mixer tubes 3 and 4 are respectively connected through resistors 36 and 37 to the positive terminal 38 of a suitable direct-current voltage source having its negative terminal grounded. The cathodes of the mixer tubes 3 and 4 are connected through suitable resistors 39, 41, 42 and 43 to the positive terminal 38. Screen and suppressor grids in the mixer tubes 3 and 4 may be respectively connected through resistors, in accordance with well-known practice in the radio art to the common terminals of resistors 39, 41, 42, 43.

The output of the mixer tube 3 is connected through a capacitor 51 to the control grid of a triode 52 provided with a serially-connected resistor 53 between its cathode and ground, thereby providing a network which functions as an amplifier. The anode of the tube 52 is connected through a resistor 54 to the positive terminal 38 and the control grid is connected to ground through a resistor 55. The anode of the mixer tube 4 is connected through a capacitor 54A and a resistor 55A to an amplifier tube 52A having connections like tube 52 and indicated by corresponding reference numerals with the suffix "A."

Figure 2:
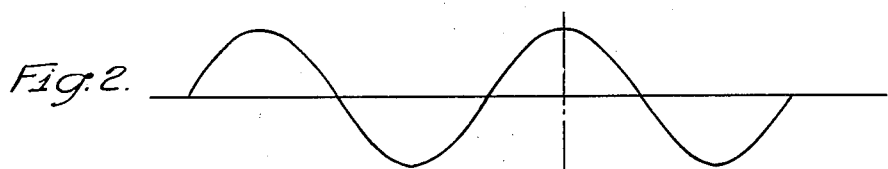

As in the case of my above-described application, the output of the mixer tubes 3 and 4 produce voltages having a frequency equal to the difference in frequency existing at any moment between the sources 1 and 2, the phase of the output voltage from mixer 4 leading by 90° the output voltage from mixer 3 when the frequency of source 1 exceeds that of source 2, and lagging by 90° behind the voltage of the mixer 3 when the frequency of source 1 is less than that of source 2. Thus, if Fig. 2 represents the output voltage of mixer 3, the output voltage of mixer 4 will be represented by the portion of Fig. 3 to the left of the vertical line when the frequency of source 1 exceeds that of source 2, and will be represented by the portion of Fig. 3 to the right of the vertical line when the frequency of source 1 is less than that of source 2.

The output of one of the above-mentioned mixers, for example, mixer 3 is connected through a pair of series connected capacitors 60 and 61, to the input of an electron tube 62 having connections causing it to act as a multi-vibrator of the type commonly referred to as "flip-flop." Thus the capacitor 61 is shunted by a resistor 63 and connected to the control electrode 64 of the tube 62. The control electrode 64 and the cathode associated therewith at the tube 62 are grounded, respectively, through resistors 65 and 66. The anode associated with the control grid 64 is connected through a resistor 67 to the positive terminal of a direct-current source having its negative terminal grounded. A second anode in the tube 62 is connected through a second resistor 68 to the same positive terminal, and is also connected to the control grid 64 through a resistor 69. The cathode associated with the last-mentioned anode is connected directly to the cathode associated with control grid 64, and a control grid associated with the last-mentioned cathode is connected to ground through a resistor 71 and to the anode which is associated with control grid 64 by a resistor 72. The connections just described will be recognized by those skilled in the art as causing the tube 62 to produce square topped output waves having the same phase as the sinusoidal input voltage illustrated in Fig. 2 as representing the output of the mixer 3. It is also within the purview of my invention to substitute for the multi-vibrator 62 any other form of device, such as a saturated amplifier, adapted to produce square topped waves when impressed with sinusoidal waves such as those of Fig. 2.

Figure 3:
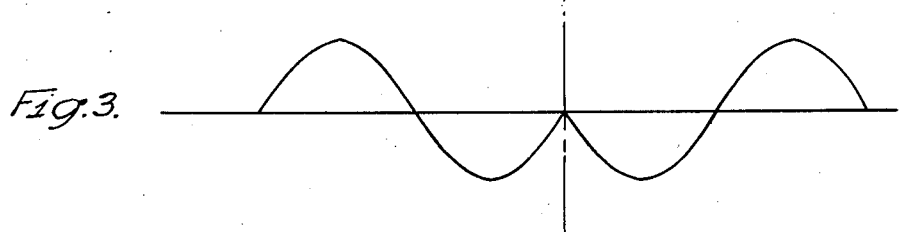
Figure 4:
Figure 5:

A pair of output capacitors 73 and 74 connect the respective anodes of the tube 62 with two sets of diode electrodes in a tube 75, thereby impressing on the respective anodes of said tube 75 voltages which are differentials of the square topped output waves of opposite phase produced across the two sets of principal electrodes in the tube 62. Thus, Fig. 4 represents the sharply peaked pulses constituting differential voltage from the anode associated with control electrode 64 and Fig. 5 represents the oppositely poled pulses constituting the differential voltages derived from the other anode of the tube 62. It will be noted that since the square topped waves produced by the multi-vibrator 62 are in phase with the sinusoidal waves in Fig. 2, the sharply peaked pulses in Figs. 4 and 5 coincide in time with the instants when the sine voltage of Fig. 2 passes through zero; and correspondingly these sharply peaked pulses are coincident with the maximum and minimum points on the sinusoidal output wave of Fig. 3 which it will be remembered is 90° displaced in phase from that of Fig. 2, and which represents the output voltage of mixer 4.

The output of mixer 4 is connected through a pair of resistors 76 and 77 to the respective anodes of tube 75. The cathodes of the diodes in tube 75 are connected to each other through a pair of equal resistors 78 and 79 whose midpoint is connected to the positive terminal of a voltage source having its negative terminal grounded. The result of the foregoing connections is that the sinusoidal output of mixer No. 4, which is represented by Fig. 3, has superposed upon it the pulses represented by Figs. 4 and 5. The result of such superposition is represented in Figs. 6 and 7.

Thus on the right-hand diode embodied in tube 75, there will be superposed on the sinusoidal wave of Figure 3, the pulses represented by Fig. 4. It will be remembered that the left-hand portion of Fig. 3 represents the output voltage of mixer 4 when the frequency source 1 is greater than that of source 2; and correspondingly the portion of Fig. 6 to the left of the vertical line represents the superimposition of the pulses of Fig. 4 on the left-hand portion of Fig. 3. On the other hand, the right-hand portion of Fig. 3 represents the output voltage of mixer 4 when the frequency of source 1 is less than that of source 2, and the right-hand portion of Fig. 6 correspondingly represents the superimposition of the pulses of Fig. 4 on the right-hand portion of Fig. 3.

Figure 7:
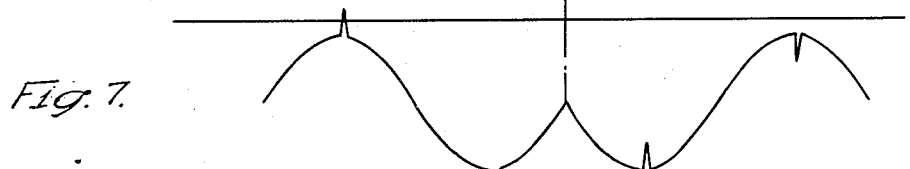

Fig. 7 represents the superimposition, in the left-hand diode of tube 75, of the sinusoidal output voltage of mixer 4 shown in Fig. 3 upon the pulsed voltage of Fig. 5.

Figure 6:
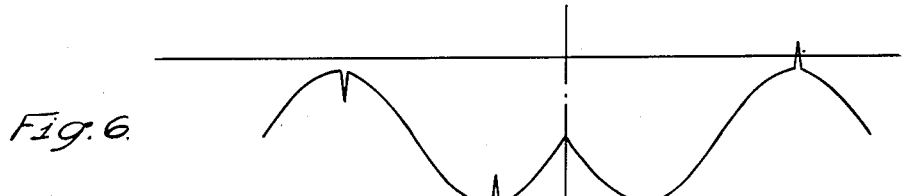

The horizontal lines near the top of Figs. 6 and 7 represent the critical voltage required to cause current flow through the two diodes comprised in tube 75. It will be noted from the left-hand portion of Fig. 6 that the pulses of Fig. 4 are always so timed that they subtract from the peak value of the sinusoidal wave as a result of which the voltage impressed on the left-hand diode in tube 75 never exceeds the above-mentioned critical voltage required to cause current flow through tube 75 as long as the frequency of source 1 exceeds that of source 2. On the other hand, from the right-hand side of Fig. 6 corresponding to the condition where the frequency of source 2 exceeds that of source 1, the pulses are superposed on the sinusoidal wave so that they increase the peak value of the resultant wave and cause it to rise above the value necessary to cause current flow through the right-hand diode of tube 75. In short, current will be conducted through the right-hand diode in tube 75 only when the frequency of source 1 is less than that of source 2.

Now turning to Fig. 7 which represents conditions in the left-hand diode in tube 75, it will be noted from the left-hand half of Fig. 7 corresponding to the condition when the frequency of source 1 exceeds that of source 2 that the pulses are superposed on the peak value of the sinusoidal wave so that they exceed the value necessary to cause current flow through the left-hand diode in tube 75 at times when the frequency of source 1 exceeds that of source 2. On the other hand, from the right-hand side of Fig. 7, it is evident that the superposition of the pulses of Fig. 5 on the sinusoidal wave of Fig. 3 is never sufficient to cause current to flow through a left-hand diode in tube 75 when the frequency of source 1 is less than that of source 2.

In short, current flows for brief intervals through the right-hand diode in tube 75 when the frequency of source 1 is less than that of source 2, and flows through the left-hand diode in tube 75 when the frequency of source 1 is greater than that of source 2.

The cathode of the left-hand diode in tube 75 is connected through a capacitor 81 in series with a resistor 82 to ground and the cathode of the right-hand diode in tube 75 is connected through a capacitor 83 and a series resistor 84 to ground. The common terminal of the capacitor 81 and resistor 82 is connected to the control electrode governing current flow between a first anode and cathode in an electron tube 85, and the common terminal of the capacitor 83 and resistor 84 is connected to a second control electrode governing current flow between a second anode and cathode in tube 85. The cathodes of the tube 85 are connected together and grounded through a resistor 86. The first anode of the tube 85 is connected to a first cathode in the electron tube 87, and the second anode of the tube 85 is connected to a second cathode in the tube 87. The anodes of the tube 87 are connected together through a resistor 88 to the positive terminal of a source of direct-current voltage which has its negative terminal grounded. These anodes are also connected to ground through a capacitor 89. The two cathodes of the tube 87 are connected to each other through a pair of serially connected equal resistors 91 and 92 and the midpoint of these resistors is connected to the positive terminal of another direct-current voltage source having its negative terminal grounded. The anodes of the tube 87 are likewise connected through a resistor 93 to the two cathodes of the tube 85. The tube 85 is so designed and supplied with voltages from the sources above mentioned as to be biased to cut off when neither of the diodes of tube 75 is conducting current, and to be driven to saturation by the pulses impressed on its control electrode when either of the diodes in tube 75 conducts the short pulses of current described above. From this arrangement it follows that one or the other of the anodes of tube 85 will conduct a definite quantity of current whenever a pulse is produced in the associated diode of tube 75. The diodes in tube 87 have a common bias and insure that the saturation voltage of the two triodes comprised in tube 85 are equal.

An amplifier tube 98 has its anode connected to the positive terminal of a direct-current voltage source, the negative terminal of which is grounded, and has its cathode connected through a pair of serially related resistors 99 and 100 to the negative terminal of a direct-current voltage source 101 which has its positive terminal grounded. A second amplifier tube 102 has its anode connected to the positive terminal of a voltage source having its negative terminal grounded and has its cathode connected to ground through a resistor 103 and also connected through another resistor 104 to the negative terminal of the voltage source 101.

A rectifier 105, which may be a diode, has its cathode connected to the cathode of the tube 98. A capacitor 94 is connected between the first anode of the tube 85 and the anode of the rectifier 105. A capacitor 95 is connected between the cathode of the tube 98 and ground.

A rectifier 108, which may be a diode, has its anode connected to the common terminal of the resistors 99 and 100. The cathode of the rectifier 108 is connected through a capacitor 96 to the second anode of the tube 85. A capacitor 97 is connected between the anode of the rectifier 108 and ground. The common terminal of capacitor 94 and the rectifier 105 is likewise connected to the negative terminal or cathode of a second rectifier 106 which may be a diode and which has its positive terminal connected to the control grids of the tubes 98 and 102.

The common terminal of the capacitor 96 and the rectifier 108 is connected to the positive terminal or anode of a rectifier 107, which may be a diode having its negative terminal connected to the control grids of the tubes 98 and 102. The control grids of the tubes 98 and 102 are connected to ground through a capacitor 109.

The mode of operation of the circuit comprising tubes 85, 87, 98 and 102 is as follows: When no current pulses are flowing through either of the diodes of tube 75, the capacitors 94 and 96 will stand charged to some voltage by current flowing through the resistors 91 and 92, the capacitors 95 and 97, the four rectifiers above described, the capacitor 109, resistors 99, 100 and source 101. Now suppose a current pulse is transmitted thru the left-hand diode in tube 75 by reason of the fact that the frequency of source 1 has become greater than the frequency of source 2. The left-hand triode in tube 85 will be rendered conductive, thereby producing a momentary increase of voltage drop through the resistor 91 which will be a fixed amount because of the saturated condition of tube 85. The capacitor 94 will, therefore, discharge a fixed quantity of current through the circuit comprising resistor 91, capacitor 109 and rectifier 106. When the current pulse ceases flowing through the left-hand diode of tube 75, the grid of the left-hand triode of tube 85 will return to its normal potential, thereby cutting off current flow through tube 85 and resistor 91. The voltage drop in resistor 91 will thus also return to its initial condition and the charge displaced from capacitor 94 will flow back through rectifier 105, from capacitor 95 which is charged through resistors 99 and 100 and source 101. The result of the foregoing action has accordingly been to deposit a fixed and definite charge in the capacitor 109, thereby increasing by a definite amount the negative potential of the grids of tubes 98 and 102 relative to ground.

In consequence of the fact that its control grid has been made more negative, the current flow through the resistor 103 in the cathode lead of tube 102 will decrease similarly by a definite amount. The ungrounded terminal of the resistor 103 is connected to the control electrode of a reactance tube and this decrease of positive potential on the control electrode will increase the equivalent reactance which that reactance tube introduces into the frequency determining circuit of the alternating-current source 1, thereby decreasing the frequency of source 1 and causing it to approach more nearly that of standard source 2. If this decrease of frequency of source 1 is not sufficient to bring it into equality with that of source 2, further pulses will be transmitted through the left-hand diode in tube 75, thus imposing a succession of further negative charges on the capacitor 109 and making the control electrode of the reactance tube less and less positive until the frequency of source 1 has been reduced to equality with that of source 2.

On the other hand, if the frequency of source 1 drops below that of source 2 at any instant, a current pulse will flow through the right-hand diode in tube 75 making the associated control electrode of tube 85 more positive, and producing an outflow of charge of constant and definite amount from capacitor 96. Capacitors 94 and 96 are made equal to each other so that, just as has previously been described for the case of capacitor 94, a definite charge of constant amount will be deposited on the capacitor 109. However, it will be noted that by reason of the opposite polarities of the rectifiers 107 and 108, the control grids of the tubes 98 and 102 will be made more positive by a definite voltage by reason of the deposition of the charge last mentioned. Current flow through the tube 102 will, accordingly, make the voltage drop through resistor 103 greater by a fixed amount and will thereby decrease the effective reactance of the reactance tube previously mentioned, so that the frequency of the source 1 will increase. Further, current pulses will flow through the right-hand diode in tube 75 with consequent further increase of positive potential on the control electrode of tube 102 until the frequency of source 1 is raised to equality with that of source 2. From the foregoing discussion, it will be evident that the capacitances of the capacitors 94 and 96 may be substantially smaller than the capacitances of the capacitors 95, 97 and 109.

It will be noted that after a current pulse from the left-hand diode of tube 75 has caused the momentary discharge from capacitor 94 of a definite quantity of electricity, a charge has been deposited in capacitor 109, thereby making the potential of the anode of rectifier 106 less positive than it was before the transaction just mentioned occurred. It will likewise be remembered that the initial discharge of capacitor 94 occurred through rectifier 106 and capacitor 109 and consequently the point at which in-flow of charge ceased was dependent upon the potential of the anode of rectifier 106 relative to its cathode. Unless some compensation were introduced the amount of charge flowing into capacitor 94 would thus be different with each succeeding pulse of current flowing through the left-hand diode of tube 75, and such compensation generally is desirable. The compensation is provided by the fact that the discharge of capacitor 94 ceases when the potential of the anode of rectifier 105 equals that of its cathode; and the potential of such cathode is fixed by the amount of current flowing through resistors 99 and 100 in the cathode lead of tube 98. Thus when the grid of tube 98 is made more negative at the termination of a current pulse through tube 75, the current flowing through the cathode resistors 99 and 100 is decreased, thereby making the potential of the cathode of tube 105 more negative by the amount necessary to fix the state of charge on capacitor 94 at a value corresponding to the increased negative potential applied to the anode of rectifier 106. The connection of the anode of rectifier 108 to the resistors 99 and 100 similarly applies the necessary compensation for the effect of the change in potential of capacitor 109 on the discharge voltage of capacitor 96.

It will be noted that by reason of the fact that the maintenance of an altered potential across the capacitor 109 is not dependent upon a continued deviation in frequency of the source 1 from that of the source 2, the regulating system I have above described is not one which merely tends to react to minimize deviation in frequency of source 1 from that of source 2; it is one which causes corrective action to continue until all deviation disappears, and the corrective action then ceases until another deviation in frequency occurs.

I claim as my invention:

1. In combination with a first alternating-current source and a second alternating-current source likely to deviate in frequency, frequency determining means for one source the regulating action of which is responsive to a direct-current voltage, means for obtaining from said first and second alternating current sources a first voltage and a second voltage having a frequency equal to the difference-frequency of said sources, said first voltage leading said second voltage in phase when the frequency of said first source exceeds that of said second source and lagging said second voltage when the frequency of said first source is less than that of said second source, means for obtaining two auxiliary voltages of opposite phase from each other by squaring and differentiating one of said voltages, means for superimposing one of said auxiliary voltages on the other of said beat frequency voltages to control current flow through a first channel, means for superimposing the other auxiliary voltage on said other beat frequency voltage to control current flow through a second channel, means for causing current flow in said first channel to charge a capacitor with a definite quantity of electricity for each cycle of beat frequency, and means for causing current flow in said second channel to discharge from said capacitor a definite quantity of electricity for each cycle of said beat frequency, and means for controlling said frequency regulating means in response to the voltage of said condenser.

2. In combination with a first alternating-current source and a second alternating-current source likely to deviate in frequency, means for deriving from said sources a first beat frequency voltage and a second beat frequency voltage, the phase of said first beat frequency voltage relative to said second beat frequency voltage changing in sign when the difference in frequency of said first source from said second source changes sign, means for squaring and differentiating the first beat frequency, means for superimposing in a first channel said second beat frequency and the output of said differentiator, means for superimposing in a second channel said second beat frequency and the negative of the output voltage of said differentiator, a saturated amplifier in said first channel rendered conductive only when said superposed voltages therein exceed a critical value, a saturated amplifier in said second channel rendered conductive only when the superposed voltages therein exceed said critical value, a capacitor in said first channel charged when the amplifier therein is conductive, a capacitor in said second channel charged only when the amplifier therein is rendered conductive, and means for causing the capacitor in said first channel to charge an auxiliary capacitor, and means in said second channel for causing the capacitor therein to discharge said auxiliary capacitor.

3. In combination with a first voltage source and a second voltage source likely to deviate therefrom in frequency, a first channel traversed by current pulses only when the frequency of said first source exceeds that of said second source, a second channel traversed by current pulses only when the frequency of said first source is less than that of said second source, the frequency of said pulses being equal to the difference-frequency of said sources, means for charging a capacitor with constant increments of positive voltage for each current pulse in said first channel, and means for charging said capacitor with constant increments of negative voltage equal in magnitude to said positive voltage for each pulse in said second channel.

4. The method of maintaining frequency equality between two alternating voltage sources which comprises deriving from said voltage sources a first beat frequency voltage and a second beat frequency voltage having a phase difference from said first beat frequency voltage which changes sign when the difference frequency of said sources passes through zero, squaring and differentiating said first beat frequency voltage, superimposing the result of said differentiation on said second beat frequency voltage positively in one current channel and negatively in the second current channel, causing current pulses in said first current channel to increase a control voltage by constant positive amounts for each cycle of beat frequency, and causing current pulses in said second channel to decrease said control voltage by equal amounts for each cycle of said beat frequency, and controlling the frequency of one of said sources by said control voltage.

5. In combination with a first alternating-current source and a second alternating-current source, means for supplying a first mixer tube with a first pair of currents derived, respectively, from said two sources, means for supplying a second mixer tube with a second pair of currents derived, respectively, from said two sources, the phase difference between said first pair of current being 90° different from the phase difference between said second pair of currents, means for squaring and differentiating the output of said first mixer tube to obtain a first pulse voltage and a second pulse voltage of opposite phase to said first pulse voltage, means for superimposing in one current channel said first pulse voltage and the output of said second mixer tube, means for superimposing in a second current channel the output of said pulse voltage and the output of said second mixer tube, the currents in said channels comprising current pulses, means for causing a first capacitor to acquire a definite charge for each pulse in said first channel and to impart a definite negative charge to an auxiliary capacitor, means for causing a second capacitor to acquire equal charge and to impart an equal negative charge to said auxiliary capacitor for each pulse in said second channel.

6. The method of balancing the frequencies of a first alternating-current source with a second alternating-current source which comprises mixing a current from said first alternating-current source with a first current derived from said second alternating-current source to produce a first output current of the difference-frequency of said sources, mixing a current from said first alternating-current source with a second current derived from said second alternating-current source which differs by substantially 90° in phase from said first current to produce a second output current having a frequency equal to the difference-frequency of said sources, squaring and differentiating said first output current to produce a first pulsed-current having said difference-frequency and also a second pulsed-current having said difference-frequency, superimposing said first pulsed-current and said second output current to produce a first pulsed-control voltage, superimposing said second pulsed-current and said second output current to produce a second pulsed-control voltage, said control voltages having the difference frequency of said sources, and increasing a frequency-control voltage for one of said sources by a definite positive amount for each pulse of said pulsed-control voltage and decreasing said frequency-control voltage by the same definite amount for each pulse of said second pulsed-control voltage.

7. In combination with a first alternating-current source and a second alterating-current source likely to deviate in frequency, means for obtaining from said sources a first voltage and a second voltage having a frequency equal to the difference-frequency of said sources, said first voltage leading said second voltage in phase when the frequency of said first source exceeds that of said second source and lagging said second voltage when the frequency of said first source is less than that of said second source, means for obtaining two auxiliary voltages of opposite phase from each other by squaring and differentiating one of said voltages, means for superimposing one of said auxiliary voltages on the other of said beat frequency voltages to control current flow through a first channel, means for superimposing the other auxiliary voltage on said other beat frequency voltage to control current flow through a second channel, means for causing current flow in said first channel to charge a capacitor with a definite quantity of electricity for each cycle of beat frequency, and means for causing current flow in said second channel to discharge from said capacitor a definite quantity of electricity for each cycle of said beat frequency, and means for causing current flow in said second channel to discharge from said capacitor a definite quantity of electricity for each cycle of said beat frequency.

8. The method of maintaining frequency equality between two alternating voltage sources which comprises deriving from said voltage sources a first beat frequency voltage and a second beat frequency voltage having a phase difference from said first beat frequency voltage which changes sign when the difference frequency of said sources passes through zero, squaring and differentiating said first beat frequency voltage, superimposing the result of said differentiation on said second beat frequency voltage positively in one current channel and negatively in the second current channel, causing current pulses in said first current channel to increase a control voltage by constant positive amounts for each cycle of beat frequency, and causing current pulses in said second channel to decrease said control voltage by equal amounts for each cycle of said beat frequency.

JOHN R. BOYKIN.

REFERENCES CITED

The following references are of record in the file of this patent:

UNITED STATES PATENTS

| Number | Name | Date |
|---|---|---|
| 1,944,315 | Clapp | Jan. 23, 1934 |
| 2,176,742 | LaPierre | Oct. 17, 1939 |
| 2,337,328 | Hathaway | Dec. 21, 1943 |
| 2,406,309 | Zeigler et al. | Aug. 20, 1946 |